United States Patent
Noro et al.

[11] Patent Number: 6,152,255
[45] Date of Patent: Nov. 28, 2000

[54] ELECTRIC POWER STEERING APPARATUS

[75] Inventors: Yoshiki Noro; Yoshinobu Mukai, both of Wako, Japan

[73] Assignee: Honda Giken Kogyo Kabushiki Kaisha, Tokyo, Japan

[21] Appl. No.: 09/096,160

[22] Filed: Jun. 11, 1998

[30] Foreign Application Priority Data

Jul. 14, 1997 [JP] Japan .................................. 9-188708

[51] Int. Cl.$^7$ ...................................................... B62D 5/04
[52] U.S. Cl. ............................ 180/446; 180/443; 701/41
[58] Field of Search .................................. 180/443, 446, 180/701; 701/41, 42, 44

[56] References Cited

U.S. PATENT DOCUMENTS

| | | | |
|---|---|---|---|
| 4,602,695 | 7/1986 | Takeshima et al. | 180/446 |
| 4,702,335 | 10/1987 | Cage et al. | 701/41 |
| 4,800,974 | 1/1989 | Wand et al. | 701/41 |
| 4,849,889 | 7/1989 | Morishita et al. | 701/41 |
| 5,717,590 | 2/1998 | Mihalko | 701/42 |
| 5,991,675 | 11/1999 | Asanuma | 701/41 |
| 5,992,558 | 11/1999 | Noro et al. | 701/41 |

FOREIGN PATENT DOCUMENTS

59-100059   6/1984   Japan .

*Primary Examiner*—Daniel G. DePumpo
*Attorney, Agent, or Firm*—Merchant & Gould P.C.

[57] ABSTRACT

An electric power steering apparatus includes a control unit for controlling a steering assist from an electric motor in accordance with steering torque detected by a torque detector. The control unit includes a plurality of assist mode generators to which are allocated respective target motor current signals representative of different steering characteristics, and any one of the assist mode generators can be switchably selected by a mode switching unit according to a predetermined condition. The mode switching unit switches between the assist modes in such a manner that one target motor current signal having been used before an assist-mode-change instruction is gradually shifted over time to another target motor current signal to be used after the assist-mode-change instruction. Thus, it is possible to prevent an unwanted abrupt change in the steering characteristic at the time of the assist mode change.

3 Claims, 10 Drawing Sheets

LOW-VELOCITY DRIVE $V_L$

FIG. 4

INTERMEDIATE-VELOCITY DRIVE $V_M$

ELECTRIC POWER STEERING APPARATUS

BACKGROUND OF THE INVENTION

1. Field of the Invention

The present invention relates to electric power steering apparatuses for automotive vehicles which provide a steering assist of an electric motor directly to the vehicle steering system to reduce steering force to be applied manually by a vehicle driver.

2. Description of the Related Art

In recent years, there has been an increasing demand that an electric steering assist to vehicle driver's manual steering operation be provided with different characteristics depending on the sex, age, driving experience, etc. of the vehicle driver. To address to such a demand, an improved electric power steering apparatus has been proposed in Japanese Patent Laid-open Publication No. SHO-59-100059, which is designed to vary the vehicle's steering characteristic by switching between normal and sports modes as desired by the vehicle driver. The proposed electric power steering apparatus includes a torque detector for detecting steering torque, a control for variably controlling power output from the electric motor in accordance with an output signal from the torque detector, and a servo-rate setting device, positioned within the reach of the vehicle driver running the automotive vehicle, for setting a desired ratio of the output torque from the motor to a level of input signal to the control. With this electric power steering apparatus, a steering characteristic as desired by the vehicle driver can be variably set by the driver operating the servo-rate setting device.

Specifically, the servo rate setting device in the proposed electric power steering apparatus is arranged to vary the relation between the level of input signal to the control and the output torque from the motor and thereby vary the steering characteristic, by setting an amplification factor of an amplifier or an attenuation factor of an attenuator connected between it's torque signal input and the output of the torque sensor. The servo rate can be set even during running or travel of the automotive vehicle.

However, in the electric power steering apparatus proposed in Japanese Patent Laid-open Publication No. SHO-59-100059, the output torque from the motor would undesirably vary depending on the thus-set servo rate even when the steering wheel is operated with same steering torque, although the steering characteristic can be varied as desired by the vehicle driver even during travel of the automotive vehicle. Because the steering characteristic varies as the servo rate is changed during steering operation, there could occur a sense of "incongruity" in the driver's steering, which would lead to a deterioration in the driver's steering feel. Particularly, variations in the steering characteristic during a high-speed drive of the automotive vehicle would significantly deteriorate the driver's steering feel and also adversely affect the vehicle behavior. Therefore, an improved electric power steering apparatus is currently desired which can effectively avoid an unwanted deterioration in the steering feel and adverse effects on the vehicle behavior.

SUMMARY OF THE INVENTION

The present invention provides an electric power steering apparatus for an automotive vehicle which comprises: an electric motor for applying an electric steering assist to a steering system of the automotive vehicle; a steering torque sensor for detecting steering torque manually applied to the steering system; a control unit for setting a target motor current corresponding at least to the steering torque detected by the steering torque sensor, the control unit having a plurality of assist modes to which are allocated respective target motor current signals different in characteristic; a drive for driving the electric motor in accordance with a motor control signal generated by the control unit on the basis of the target motor current; and a mode switching unit, provided in the control unit, for, in response to an assist-mode-change instruction, effecting a successive, gradual shift, over time, from the target motor current signal of one of the assist modes having been used before the assist-mode-change instruction to the target motor current signal of another of the assist modes to be used after the assist-mode-change instruction. With such an arrangement, the steering apparatus of the invention effectively prevents an abrupt change in the steering characteristic due to a mode change and provides for a successive, gradual and hence natural shift to a newly selected steering characteristic without adversely affecting the driver's steering feel and vehicle behavior.

In a preferred implementation, the mode switching unit includes: a data receiving section for receiving the target motor current signals of both the assist modes before and after the assist-mode-change instruction; a transition coefficient generator for generating a transition coefficient time-varying in value within a predetermined transition period; and an arithmetic operator for calculating the target motor current to be used during the course of a shift between the assist modes, on the basis of the target motor current signals of the assist modes before and after the assist-mode-change instruction and the transition coefficient generated by the transition coefficient generator. Thus, the steering characteristic to be applied during the course of a shift to a newly-selected steering can be determined appropriately by the transition coefficient varying in value over time within the predetermined transition period, which achieves a gradual and smooth change between the steering characteristics of different steering assist modes. As a result, it is possible to effect an assist mode change, i.e., an increase or decrease in electric steering assist, in a natural manner without involving a sense of incongruity.

Further, in a preferred implementation, the mode switching unit, at each of a plurality of predetermined unit processing times within the transition period, calculates the target motor current to be used during the course of the shift, through arithmetic operations using a current value of one of the target motor current signals of the two assist modes before and after the assist-mode-change instruction and a last value of another of the target motor current signals. In this case, the use of the current and last values alternates between the target motor current signals every unit processing time in such a manner that the current value of the target motor current signal used at a particular unit processing time is used as the last value of that target motor current signal at the next unit processing time. Thus, it is possible to effectively lessen the arithmetic operations for determining a steering characteristic to be applied during the course of a shift to a newly selected steering assist mode, and the present invention permits a steering characteristic change with significantly enhanced responsiveness.

BRIEF DESCRIPTION OF THE DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

Figure 1:
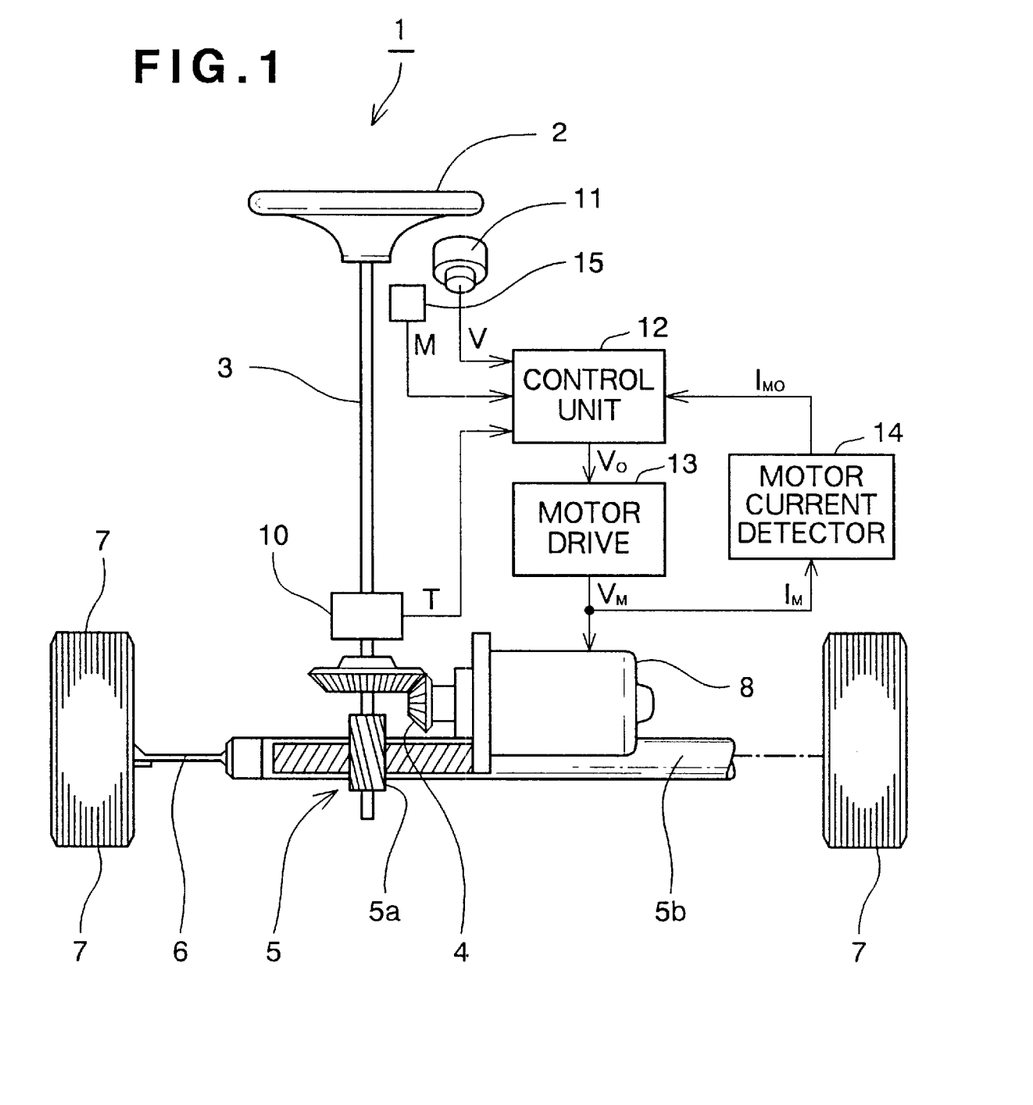
FIG. 1 is a diagram showing the overall setup of an electric power steering apparatus according to a preferred embodiment of the present invention.

FIG. 1 is a block diagram showing the general structure of an electric power steering apparatus according to one embodiment of the present invention. Mechanically, the electric power steering apparatus 1 comprises a steering wheel 2, a steering shaft 3, a hypoid gear 4, a rack-pinion-type steering gear 5 including a pinion 5a and a rack shaft 5, left and right steerable front wheels 7 connected to the rack shaft 5b via tie rods 6, and an electric motor 8, such as a D.C. motor or brushless motor, for generating an electric steering assist.

As electric component parts, the electric power steering apparatus 1 comprises a steering torque sensor 10, a vehicle velocity sensor 11, a control unit 12, a motor drive 13, and a motor current detector 14. The steering torque sensor 10 detects steering torque acting on the steering wheel 2 and outputs a steering torque signal T that is an electric signal corresponding to the detected steering torque. The vehicle velocity sensor 11 detects a velocity of the automotive vehicle and outputs a vehicle velocity signal V that is an electric signal corresponding to the detected vehicle velocity. The control unit 12 sets a target motor current for driving the electric motor 8 on the basis of the steering torque signal T and vehicle velocity signal V and also generates a motor control signal $V_O$ corresponding to the target motor current. The motor drive 13 drives the electric motor 8 with a motor voltage $V_M$ based on the motor control signal $V_O$, using the known PWM (Pulse Width Modulation) control scheme. The motor current detector 14 detects a motor current $I_M$ corresponding to forward or reverse rotary motion of the electrical motor 8.

The electric power steering apparatus 1 further includes a mode setting device 15 disposed, for example, near the driver's seat, which issues a mode setting signal M for purposes to be described below. In response to the mode setting signal M from the mode setting device 15, a particular assist mode generator is switchably selected from among a plurality of assist mode generators to which are allocated different characteristics (e.g., level values) of the target motor current, as will be described below. The switchable selection of one of the assist modes via the mode setting device 15 may be made depending on a current operating position of a shift lever where the automotive vehicle in question is of the automatic transmission type, or in accordance with an operating condition of the automatic transmission. In another alternative, the switchable selection of one of the assist modes may be made automatically depending on a friction coefficient $\mu$ between the road surface and the vehicle tires.

As the vehicle driver manually operates the steering wheel 2, the torque sensor 10 detects steering torque to feed a steering torque signal T to the control unit 12. The steering torque manually applied by the vehicle driver to the steering shaft 3 is converted, via the rack-pinion-type steering gear 5, into an axial linear movement of the rack shaft 5b, which changes the steering direction of the front wheels 7 by way of the tie rods 6.

Figure 2:
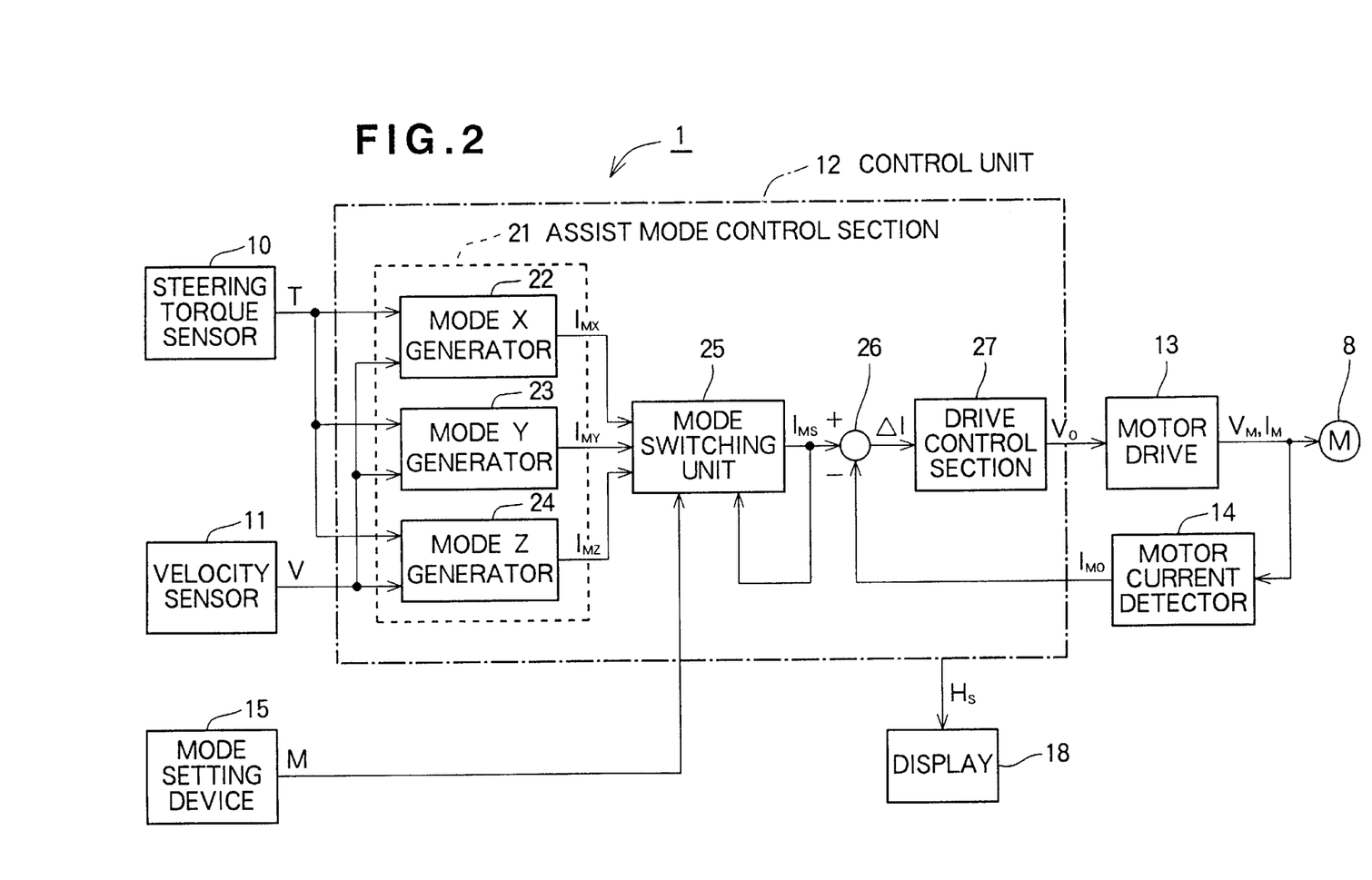
FIG. 2 is a block diagram showing principal parts of the electric power steering apparatus of FIG. 1.

FIG. 2 is a block diagram showing principal parts of the electric power steering apparatus of FIG. 1. The control unit 12, basically comprising a microprocessor, an arithmetic operation section, a processing section and a memory, includes an assist mode control section 21 having a plurality of assist mode generators 22 to 24 to which are allocated different characteristics (e.g., level values) of the target motor current corresponding at least to steering torque signal T. In response to a mode setting signal M given from the mode setting device 15, the control unit 12 selects a particular one of the assist mode generators 22 to 24 to which is allocated the target motor current characteristic corresponding to the signal M. Then, the control unit 12 generates a motor control signal $V_O$ corresponding to a target motor current signal from the selected assist mode generator, in accordance with which the motor drive 13 drives the motor 8 with a motor voltage $V_M$. The selected assist mode generator is visually and audibly displayed to the vehicle driver by means of a display 18.

Most importantly, the control unit 12 includes a mode switching unit 25, which provides for a successive, gradual shift between target motor current signals before and after an assist-mode-change instruction from the vehicle driver via the mode setting device 15 and thereby prevents an abrupt change in the target motor current signal due to the mode change. The motor drive 13 includes a plurality of (e.g., four) switching elements such as power FETs (Field Effect Transistors) and generates a motor voltage $V_M$ corresponding to the motor control signal $V_O$ (PWM signal) so that the motor 8 is driven by a bidirectional motor current $I_M$ corresponding to the absolute value and direction of the steering torque signal T.

Torque generated by the electric motor 8 is increased twofold via the hypoid gear 4 and applied to the steering shaft 3 as an electric steering assist. The motor current detector 14 converts the motor current $I_M$, to be actually passed to the motor 8, into voltage by means of resistance and/or Hall effect device, and the converted voltage is then again converted into a digital detected motor current signal $I_{MO}$. The digital detected motor current signal $I_{MO}$ is sent to the control unit 12 for negative feedback to the target motor current.

More specifically, the assist mode control section 21, which is based on a memory such as a ROM, has a plurality of the assist mode generators, i.e., assist mode X generator 22, assist mode Y generator 23 and assist mode Z generator 24. The control unit also includes an offset calculating section 26 and a drive control section 27. Whereas the assist mode control section 21 is shown in the illustrated example as having three assist mode generators, it may have four or more assist mode generators. Thus, on the basis of the steering torque signal T and vehicle velocity signal V from the torque and velocity sensors 10 and 11, the assist mode generators 22 to 24 output target motor current signals $I_{MX}$, $I_{MY}$, $I_{MZ}$ (representing different characteristics of the target motor current) to the mode switching unit 25.

More specifically, in the assist mode X generator 22, various level values of target motor current signal $I_{MX}$ corresponding to various possible values of steering torque signal T are empirically obtained and stored in association with values of vehicle velocity signal V as parameters, so that the generator 22 supplies the mode switching unit 25 with one of the values of target motor current signal $I_{MX}$ corresponding to the steering torque signal T and vehicle velocity signal V currently detected by the torque and velocity sensors 10 and 11. Similarly, in each of the assist mode Y generator 23 and assist mode Z generator 4, various values of target motor current signal $I_{MY}$ or $I_{MZ}$ and corresponding to various possible values of steering torque signal T are empirically obtained and stored in association with values of vehicle velocity signal V as parameters, so that the generator 23 or 24 supplies the mode switching unit 25 with one of the values of target motor current signal $I_{MY}$ or $I_{MZ}$ corresponding to the steering torque signal T and vehicle velocity signal V currently detected by the torque and velocity sensors 10 and 11.

Thus, the assist mode X generator 22 provides a target motor current characteristic (level value) suitable for a situation where a great electric steering assist relative to the steering torque T is required, namely, suitable for beginner's-class, female or aged vehicle drivers who need to be supplied a greater electric steering assist in response to manual operation of the steering wheel with small force. The assist mode Y generator 23 provides a target motor current characteristic, corresponding to those obtained by the conventional normal-mode steering operation, which will afford a smaller electric steering assist than that given by the assist mode X generator 22 in response to the same manual steering force. Further, the assist mode Z generator 24 provides a target motor current signal characteristic, corresponding to those obtained by the conventional sports-mode steering operation, which will afford a yet smaller electric steering assist than that given by the assist mode Y generator 23.

Figure 3:
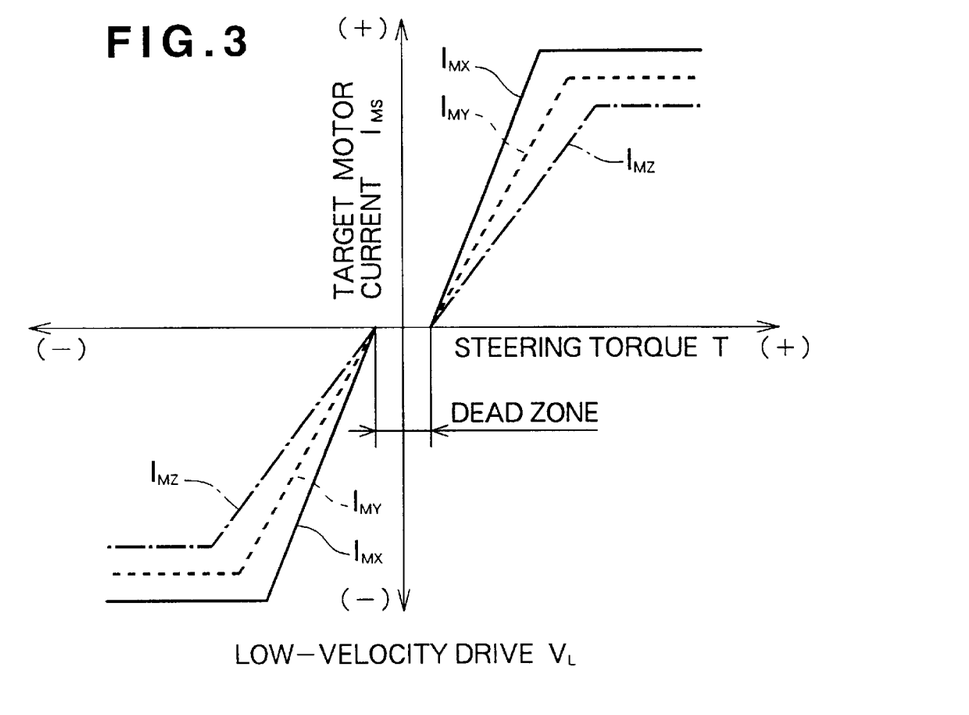
FIG. 3 is a graph showing exemplary control characteristic curves, of a target motor current versus detected steering torque for a low-velocity drive, employed in a mode control section of FIG. 2.

FIG. 3 is a graph showing exemplary control characteristic curves, of the target motor current $I_{MS}$ versus the steering torque T for a low-velocity drive $V_L$, employed in the assist mode control section 21. In a region where the steering torque signal T is in a small-value range at and around "0", there exists a "dead zone" where the target motor current $I_{MS}$ maintains a value "0" irrespective of an increase in the value of the steering torque signal T. As the steering torque signal T increases in value beyond the dead zone, the value of the target motor current $I_{MS}$ increases linearly and then reaches a saturated zone where it remains constant irrespective of the increasing value of the steering torque signal T.

As shown in FIG. 3, in the low-velocity driving condition $V_L$, the assist mode generators 22, 23 and 24 of FIG. 2 generate a target motor current signal $I_{MX}$ (solid line), target motor current signal $I_{MY}$ (broken line) and target motor current signal $I_{MZ}$ (dot-dash line), respectively, in response to the steering torque signal T. These target motor current signals $I_{MX}$, $I_{MY}$ and $I_{MZ}$ are of different values decreasing in the mentioned order; that is, the target motor current signal $I_{MX}$ generated by the assist mode X generator 22 has the greatest value and the target motor current signal $I_{MZ}$ generated by the assist mode Z generator 24 has the smallest value. Thus, the vehicle driver can select a desired one of the assist mode generators 22, 23 and 24 and hence-set a target motor current signal $I_{MX}$, $I_{MY}$ or $I_{MZ}$ suitable for his or her actual manual steering force, by operating the mode setting device 15.

Figure 4:
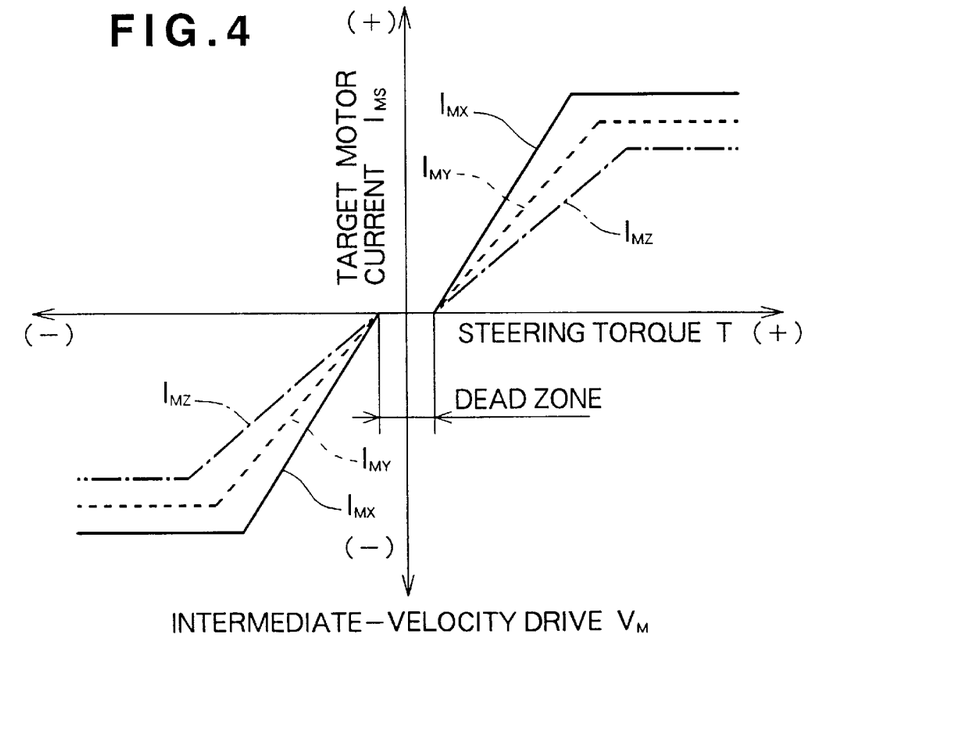
FIG. 4 is a graph showing exemplary control characteristic curves, of the target motor current versus the detected steering torque for an intermediate-velocity drive, employed in the mode control section.

FIG. 4 is a graph showing exemplary control characteristic curves, of the target motor current $I_{MS}$ versus the steering torque T for an intermediate-velocity drive $V_M$, employed in the assist mode control section 21. In the intermediate-velocity driving condition $V_M$, target motor current signals $I_{MX}$, $I_{MY}$ and $I_{MZ}$ present trends similar to those presented in the low-velocity driving condition $V_L$ of FIG. 3, but these signals $I_{MX}$, $I_{MY}$ and $I_{MZ}$ increase in value at a slower rate than the counterparts of FIG. 3 and reach saturated values smaller than those of FIG. 3.

By thus setting the target motor current signals $I_{MX}$, $I_{MY}$ and $I_{MZ}$ for the intermediate-velocity drive $V_M$ to be smaller in value than the counterparts for the low-velocity drive $V_L$, the electric steering assist from the motor 8 is controlled to become smaller as the vehicle velocity increases; that is, manual steering force to be applied by the vehicle driver, i.e., the driver's steering effort gets heavier as the automotive vehicle speeds up. Further, even in the intermediate-velocity driving condition $V_M$, the vehicle driver can select any one of the three target motor current signals $I_{MX}$, $I_{MY}$ and $I_{MZ}$ from the assist mode generators 22, 23 and 24 by operating the mode setting device 15, so that an optimum electric steering assist is always achieved for the driver's actual manual steering.

Figure 5:
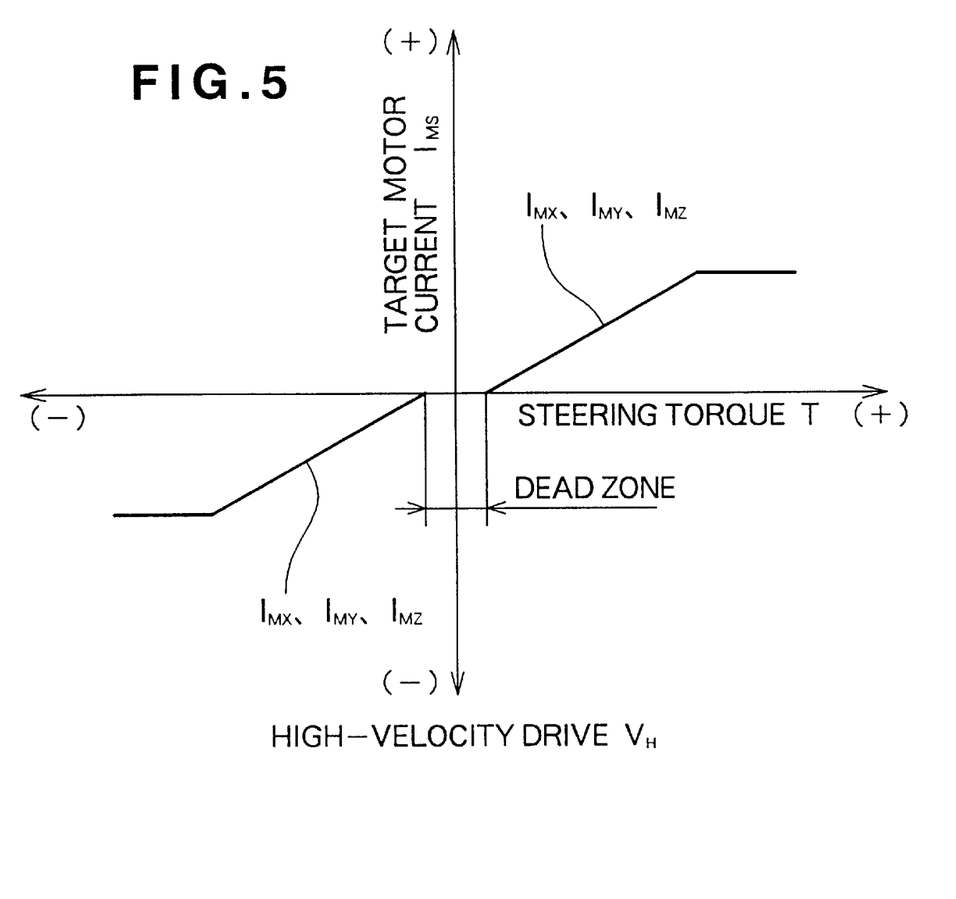
FIG. 5 is a graph showing exemplary control characteristic curves, of the target motor current versus the detected steering torque for a high-velocity drive, employed in the mode control section.

FIG. 5 is a graph showing exemplary control characteristic curves, of the target motor current $I_{MS}$ versus the steering torque T for a high-velocity drive $V_H$, employed in the assist mode control section. As shown, in the high-velocity driving condition $V_M$, the assist mode generators 22, 23 and 24 generate respective target motor current signals $I_{MX}$, $I_{MY}$ and $I_{MZ}$ that are substantially identical to each other in value. In the high-velocity driving condition $V_H$, a large-value target motor current $I_{MS}$ is always unnecessary irrespective of manual steering force applied by the vehicle driver, and it is essential that the target motor current signals $I_{MX}$, $I_{MY}$ and $I_{MZ}$ present little or no variations in their values when there occurs a switch from one assist mode to another (assist mode change).

Figure 6:
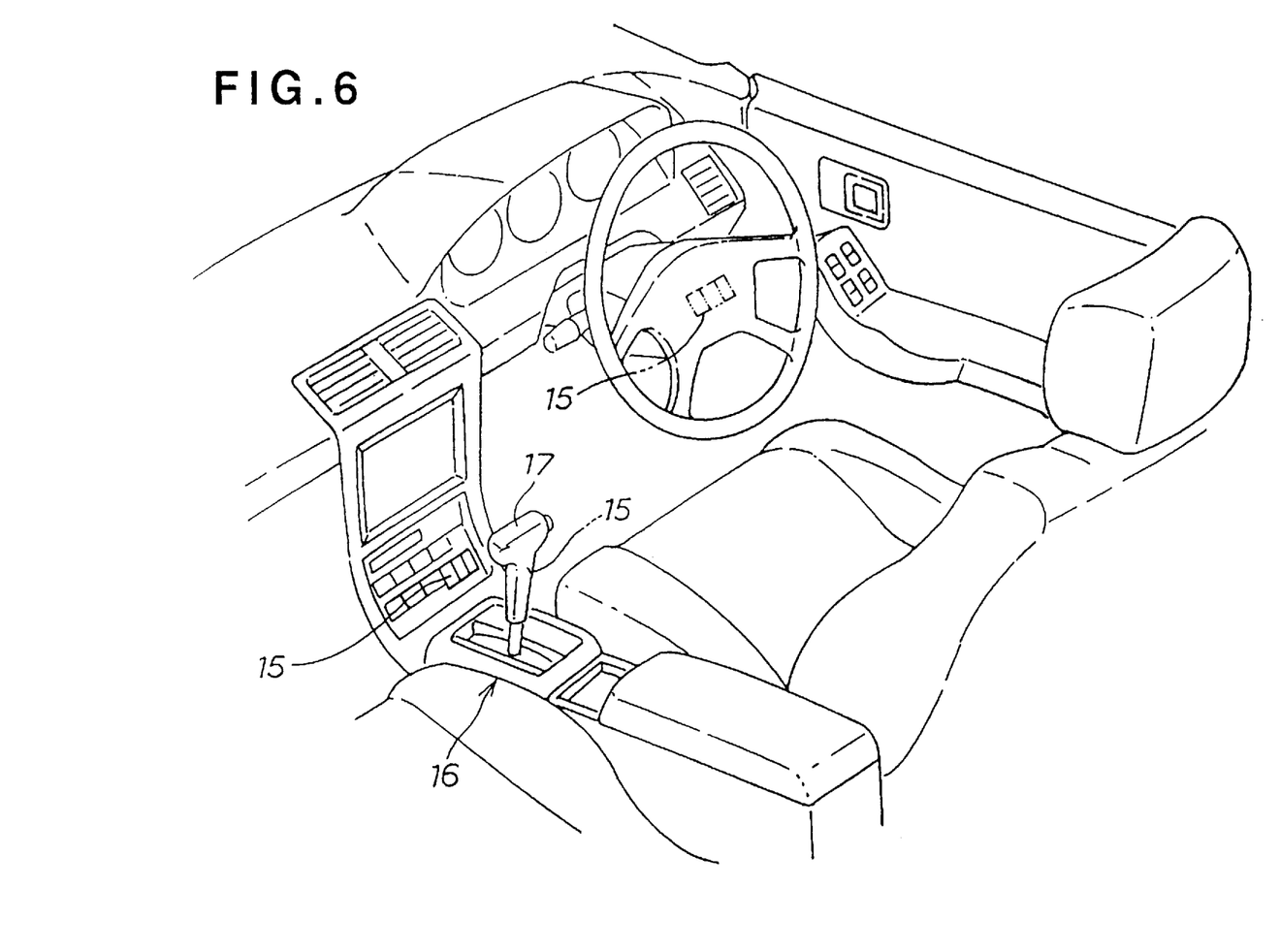
FIG. 6 is a perspective view showing exemplary positions where a mode setting device of FIG. 1 is mounted inside an automotive vehicle near the driver's seat.

FIG. 6 is a perspective view showing an exemplary manner in which the mode setting device 15 is provided inside the automotive vehicle near the driver's seat. In the figure, the setting device 15 is shown as comprising a plurality of push button switches provided in corresponding relations to the assist mode generators 22 to 24 of the assist mode control section 21 shown in FIG. 2; these push buttons may be positioned on the surface of an operation panel or steering wheel or a shift lever 17 of an automatic transmission 16 if the automotive vehicle is of the automatic-transmission type.

Figure 7:
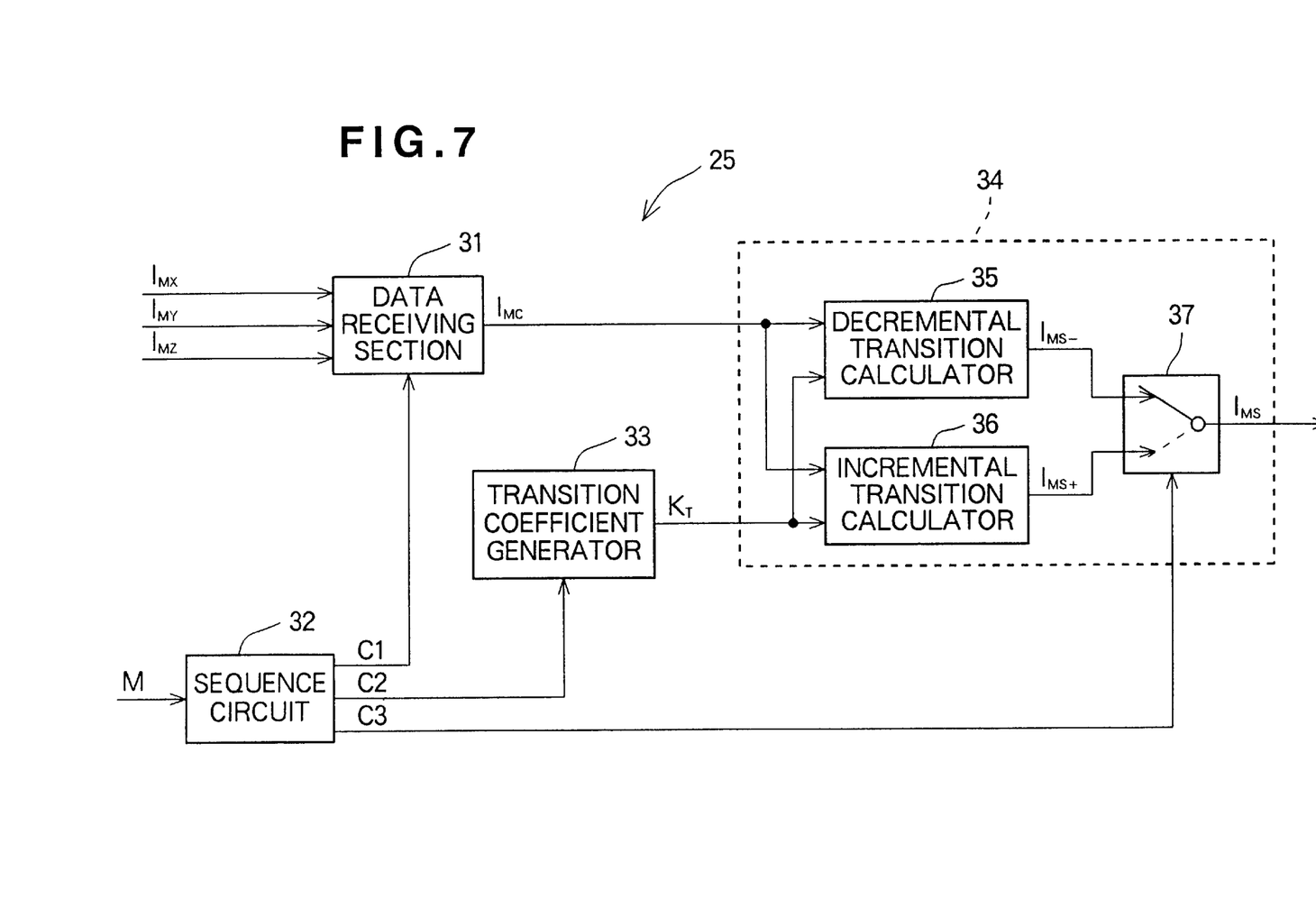
FIG. 7 is a block diagram illustrating principal parts of a mode switching unit of FIG. 2.

FIG. 7 is a block diagram illustrating principal parts of the mode switching unit 25 of FIG. 2, which includes a data receiving section 31, a sequence circuit 32, a transition coefficient generator 33 and an arithmetic operator 34. The data receiving section 31 may comprise a temporary storage circuit consisting of two registers. In response to a sequence signal C1 received from the sequence circuit 32 when an assist-mode-change instruction is given, the data receiving section 31, at each of a plurality of unit processing times within the predetermined transition period, receives and temporarily stores one of the target motor current signals from the generators 22, 23, 24 having been used till the assist-mode-change instruction, i.e., a pre-mode-change target motor current signal (e.g., $I_{MX}$) into one of the registers. Also, the data receiving section 31 receives and temporarily stores another of the target motor current signals to be used after the assist-mode-change instruction, i.e., a post-mode-change target motor current signal (e.g., $I_{MY}$). After that, the data receiving section 31 sequentially passes the pre-mode-change target motor current signal $I_{MX}$ and post-mode-change target motor current signal $I_{MY}$, as current signals $I_{MC}$, to the arithmetic operator 34 for arithmetic subsequent operations as will be later described.

In an alternative, the data receiving section 31 may comprise a temporary storage circuit in the form of a register and a rewritable memory in the form of a RAM. At each of the unit processing times, the register stores therein one of the pre-mode-change target motor current signal and post-mode-change target motor current signal while the RAM receives and stores therein the other of the signals stored in the register at the preceding unit processing time, so that the one signal $I_{MX}$ (or $I_{MY}$) stored in the register and the other signal $I_{MY}$ (or $I_{MX}$) stored in the RAM are simultaneously passed to the arithmetic operator 34 for arithmetic subsequent operations as will be later described.

The sequence circuit 32 is responsive to the mode setting signal M to generate a plurality of sequence signals C1, C2 and C3. The sequence signal C1 is intended to control the data receiving section 31 to receive the premode-change target motor current signal (e.g., $I_{MX}$) and the post-mode-change target motor current signal (e.g., $I_{MY}$) alternately at predetermined timing. The sequence signal C2 functions as a trigger signal that causes the transition coefficient generator 33 to generate a transition coefficient $K_T$. The sequence signal C3 controls the switching action of a switch section 37 as will be described later.

Specifically, in response to the triggering sequence signal C2, the transition coefficient generator 33 generates the transition coefficient $K_T$, successively varying in value from "1" to "0" within the predetermined transition period, which is fed to the arithmetic operator 34. More specifically, the transition coefficient $K_T$ is set to decrease from "1" to "0" within the predetermined transition period in linear or exponential function.

Figure 8:
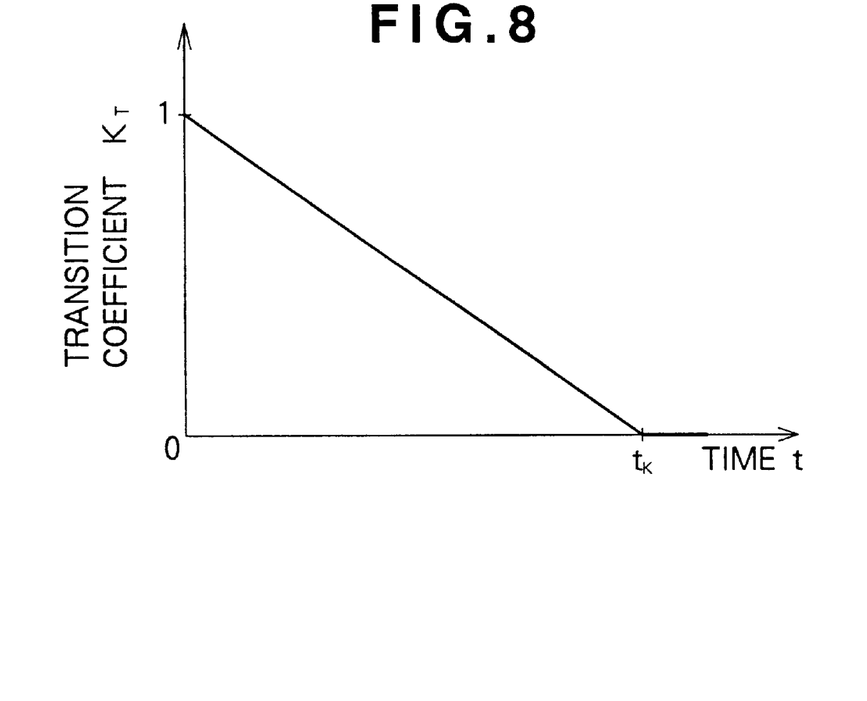
FIG. 8 is a graph illustrating an exemplary characteristic curve of a transition coefficient that is set, in the embodiment, to decrease from "1" to "0" in linear function within a predetermined transition period.

FIG. 8 is a graph illustrating an exemplary characteristic curve of the transition coefficient $K_T$ that is set, in the present embodiment, to decrease from "1" to "0" within the predetermined transition period $t_K$ in linear function. The transition coefficient $K_T$ presents a characteristic of linearly decreasing in value with passage of the transition period $t_K$, by being set to the value "1" at the start of the period $t_K$ (t=0), i.e., when the sequence signal C2 is supplied from the sequence circuit 32, and then to the value "0" at the end of the period $t_K$ (t=$t_K$). After expiration of the predetermined transition period $K_T(t \geq t_K)$, the transition coefficient $t_T$ is maintained at the "0" value.

Referring back to FIG. 7, the arithmetic operator 34 includes a decremental transition calculator 35, an incremental transition calculator 36 and the above-mentioned switch section 37. The decremental transition calculator 35 includes a multiplier or multiplication function, an adder or addition function, and a comparator or comparison function to compare the level values of the pre-mode-change target motor current signal (e.g., $I_{MX}$) and the post-mode-change target motor current signal (e.g., $I_{MY}$).

When the mode setting device 15 is operated by the vehicle driver to make a shift from the target motor current signal $I_{MX}$ (assist mode X) to the target motor current signal $I_{MY}$ (assist mode Y), the decremental transition calculator 35 executes an arithmetic operation of Equation (1) below on the basis of the current signal $I_{MC}$ (alternating in value between $I_{MX}$ and $I_{MY}$) fed from the data receiving section 31 and the transition coefficient $K_T$ fed from the transition coefficient generator 33, so as to supply the switch section 37 with a target motor current $I_{MS-}$ decreasing from the signal value $I_{MX}$ to the signal value $I_{MY}$ with passage of time:

$$I_{MS-} = K_T \cdot I_{MX} + (1 - K_T) \cdot I_{MY} \qquad \text{EQUATION (1)}$$

Figure 9:
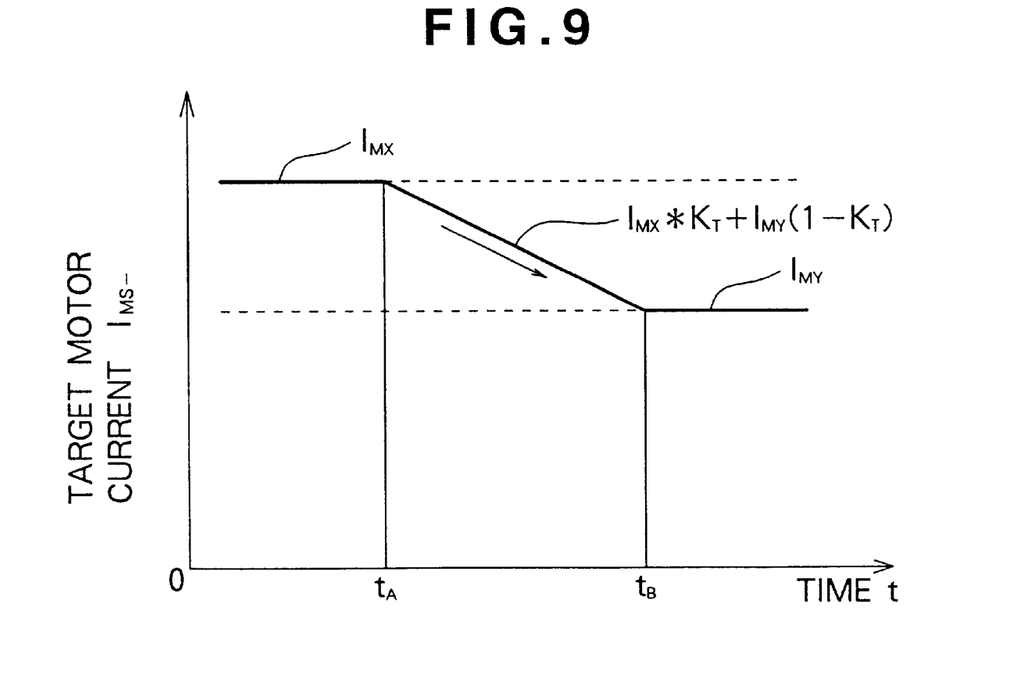
FIG. 9 is a graph illustrating a control characteristic curve, of the target motor current signal varying in value with time, employed in the present embodiment.

FIG. 9 is a graph illustrating a control characteristic curve, of the target motor current signal $I_{MS-}$ varying in value with time t, employed in the present embodiment, which specifically shows a manner in which the signal value $I_{MX}$ is caused to shift to the signal value $I_{MY}$ by the vehicle driver instructing a change from the assist mode X to the assist mode Y. Namely, once the vehicle driver instructs a change from the assist mode X to the assist mode Y at time point $t_A$, the target motor current signal $I_{MS-}$ generated by the decremental transition calculator 35 decreases from the mode X signal value $I_{MX}$ to the mode Y signal value $I_{MY}$ in accordance with the transition coefficient $K_T$ decreasing from "1" to "0" with passage of time $K_T$, so that it becomes the signal $I_{MY}$ at time point $T_B$. After time point $T_B$, the transition coefficient $K_T$ is maintained at "0" and thus the target motor current signal $I_{MS-}$ keeps the mode Y signal value $I_{MY}$.

Similarly, the incremental transition calculator 36 of FIG. 7 includes a multiplier or multiplication function, an adder or addition function, and a comparator or comparison function to compare the level values of the pre-mode-change target motor current signal (e.g., $I_{MX}$) and the post-mode-change target motor current signal (e.g., $I_{MY}$).

When the mode setting device 15 is operated to make a shift from the target motor current signal $I_{MY}$ (assist mode Y) to the target motor current signal $I_{MX}$ (assist mode X), the incremental transition calculator 36 executes an arithmetic operation of Equation (2) below on the basis of the current signal $I_{MC}$ (alternating between the signal values $I_{MY}$ and $I_{MX}$) fed from the data receiving section 31 and the transition coefficient $K_T$ fed from the transition coefficient generator 33, so as to supply the switch section 37 with a target motor current $I_{MS+}$ increasing in value from the signal $I_{MY}$ to the signal $I_{MX}$ with passage of time:

$$I_{MS+} = I_{MX}(1 - K_T) + I_{MY} K_T \qquad \text{EQUATION (2)}$$

Figure 10:
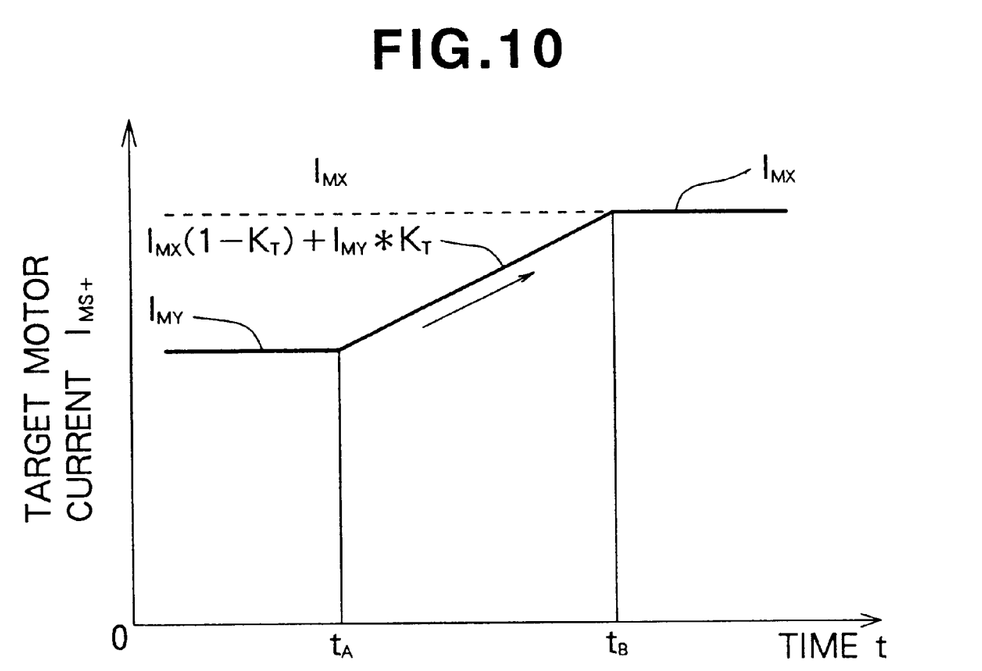
FIG. 10 is a graph illustrating another control characteristic curve, of the target motor current signal varying in value with time, employed in the present embodiment.

FIG. 10 is a graph illustrating a control characteristic curve, of the target motor current signal $I_{MS+}$ varying in value with time t, employed in the present embodiment, which specifically shows a manner in which the signal value $I_{MY}$ is caused to shift to the signal value $I_{MX}$ by the vehicle driver instructing a change from the assist mode Y to the assist mode X. Namely, once a change is made from the assist mode Y to the assist mode X at time point $t_A$, the target motor current signal $I_{MS+}$ generated by the incremental transition calculator 36 increases from the mode Y signal $I_{MY}$ to the mode X signal $I_{MX}$ in accordance with the transition coefficient $K_T$ decreasing from "1" to "0" with passage of time t on the basis of Equation (2), so that it becomes the signal $I_{MY}$ at time point $T_B$. After time point $T_B$, the transition coefficient $K_T$ is maintained at "0" and hence the target motor current signal $I_{MS+}$ keeps the mode X signal value $I_{MX}$.

Whereas changes between the assist modes X and Y have been described above with reference to FIGS. 9 and 10, operations similar to the above-mentioned take place for changes between the modes X and Z and between the modes Y and Z. Further, whereas the above description has been made in relation to the example where the target motor current signals $I_{MX}$ and $I_{MY}$ do not change with time t, an assist mode change can be made smoothly with passage of time t even in the case where signals $I_{MX}$ and $I_{MY}$ are set to vary with time t.

In response to the sequence signal C3 supplied from the sequence circuit 32 on the basis of a driver-selected assist mode, the switch section 37, which comprises an electronic switch or software-controlled switch function, selects one of the target motor current signals $I_{MS-}$ and $I_{MS+}$ to thereby output the target motor current $I_{MS}$.

By the data receiving section 31 receiving the target motor current signals corresponding to a selected assist mode, the transition coefficient generator 33 generating the transition coefficient $K_T$ varying in value with time and the arithmetic operator 34 calculating the target motor current to be applied during the course of an assist mode change or shift on the basis of the mode-corresponding target motor current signal and transition coefficient $K_T$, the mode switching unit 25 can determine an appropriate steering characteristic, to be applied during the course of the assist mode change, using the transition coefficient $K_T$ corresponding to a transition period and thereby provides for a smooth shift in the steering characteristic during the course of an instructed change between different steering assist modes.

Referring back to FIG. 2, the offset calculating section 26 comprises a subtracter or software-controlled subtraction function which calculates a difference or offset between the target motor current $I_{MS}$ (target motor current signal $I_{MX}$, $I_{MY}$ or $I_{MZ}$) sent via the mode switching unit 25 and the digital detected motor current signal $I_{MO}$ corresponding to the motor current $I_M$ detected by the motor current detector 14, and feeds the thus-calculated offset $\Delta(=I_{MS}-I_{MO})$ to the drive control section 27.

The drive control section 27 includes a PID controller that applies PID (Proportional and Integral and Derivative) compensation operations to the offset signal $\Delta I$ ($=I_{MS}-I_{MO}$), and a signal generator that generates a motor control signal $V_O$ that is a composite or combination of a PWM (Pulse-Width-Modulated) signal and ON signal to control the direction and intensity of torque generated by the motor 8 on the basis of an output signal from the PID controller.

The motor drive 13 includes a bridge circuit comprised of a plurality of (e.g., four) switching elements such as power FET's (Field-Effect Transistors) and is controlled by the motor control signal $V_O$ containing the PWM (Pulse-Width-Modulated) signal and ON signal, so as to feed motor voltage $V_M$ of a given direction and intensity to the motor 8. Thus, the motor 8 is driven, by the motor voltage $V_M$ fed from the motor drive 13, to generate power or torque corresponding to the motor current $I_M$, and the thus-generated torque is applied to the vehicle steering system as an electric steering assistance.

Further, the motor current detector 14, which may comprise a Hall effect device or resistor for detecting current as voltage, detects the motor current $I_M$ passing through the motor 8 and feeding digital detected motor current $I_{MO}$ back to the negative (−) input of the offset calculating section 26. The motor current detector 14 constitutes a negative feedback loop together with the offset calculating section 26, drive control section 27 and motor drive 13, and control is performed such that the offset signal $\Delta I$ ($=I_{MS}-I_{MO}$) promptly becomes zero ($I_{MS}=I_{MO}$) so that the motor current $I_M$ promptly equals the target motor current $I_{MS}$, Display 18, which may comprise a visual display such as a liquid crystal display or an audio display such as a sound synthesizer, visually or aurally informs the vehicle driver of various states of the currently-selected control assist mode.

With the mode switching unit 25 effecting a successive, gradual shift over time from a pre-mode-change target motor current signal to a post-mode-change target motor current signal, the electric power steering apparatus can reliably avoid an abrupt steering characteristic change at the time of an assist mode change, thereby achieving a smooth shift to a newly-selected steering characteristic.

Figure 11:
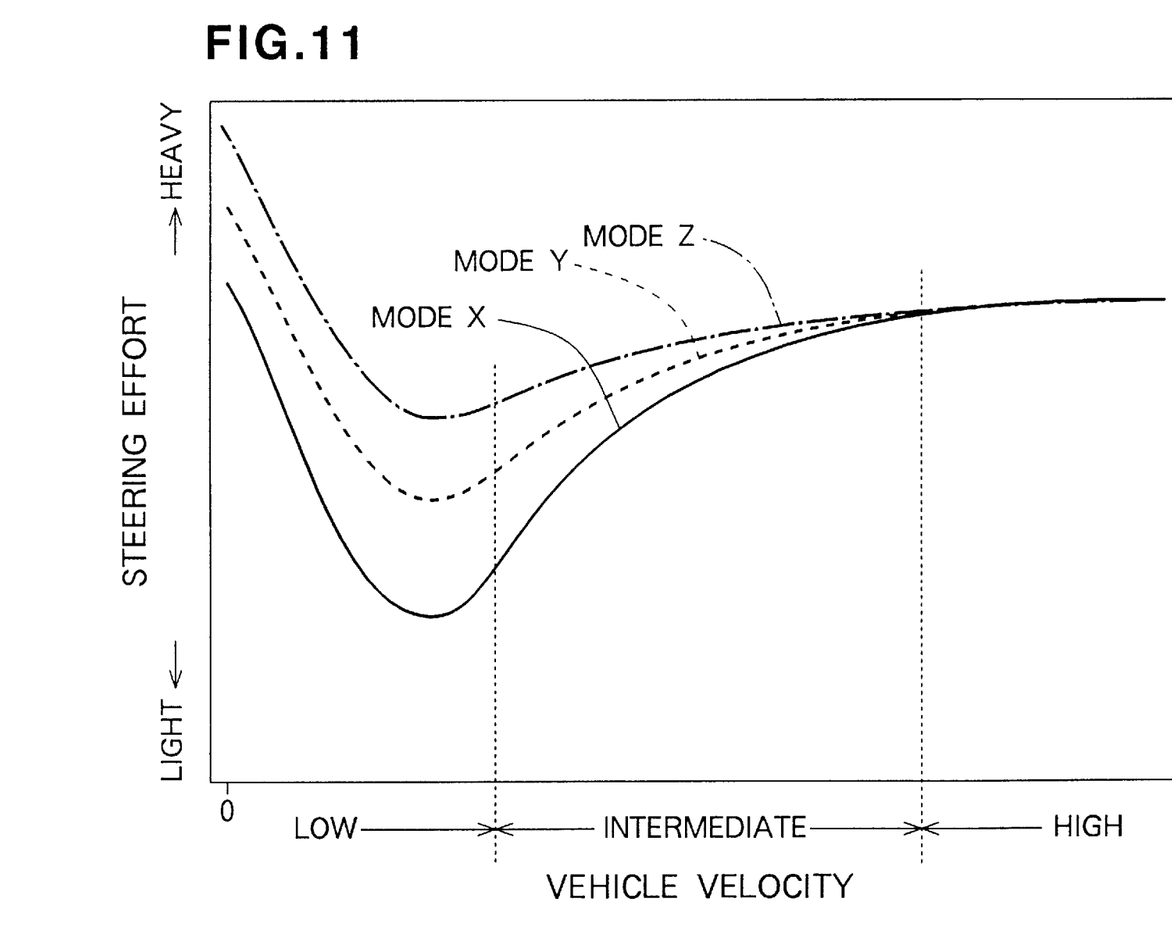
FIG. 11 is a graph showing relationships between vehicle velocity and necessary manual steering force in three assist modes of the electric power steering apparatus.

FIG. 11 is a graph showing relationships between vehicle velocity and manual steering force (steering effort) in the three assist modes of the electric power steering apparatus according to the present invention. As shown, a go manual steering force that needs to be applied by the vehicle driver to largely turn the steering wheel during stoppage of the automotive vehicle, i.e., when the vehicle velocity is "0" (hereinafter called "during-stoppage steering force") is relatively great in all of the assist modes X, Y and Z; more specifically, the "during-stoppage steering force" in the assist mode X is set to be smaller than the "during-stoppage steering force" in the mode Y which is in turn set to be smaller than that in the mode Z.

As the vehicle velocity increases during a low-velocity drive, counteractive force from the road surface decreases and the electric steering assist is governed by the control characteristics of FIG. 3, so that the necessary steering force or steering effort in the assist mode X (corresponding to target motor current signal $I_{MX}$) becomes additionally heavier than that in the mode Y (corresponding to target motor current signal $I_{MY}$) which in turn becomes additionally heavier than that in the mode Z (corresponding to target motor current signal $I_{MZ}$).

Then, in an intermediate-velocity drive, the electric steering assist is governed by the control characteristic of FIG. 4, so that the differences between the steering efforts in the three assist modes gradually increase due to an automatically-occurring great braking action responsive to the increasing vehicle velocity, although the magnitudes of the necessary steering forces or steering efforts remain in the above-mentioned order. Further, in a high-velocity drive, the electric steering assist is governed by the control characteristic of FIG. 5, so that the steering efforts in the three assist modes become substantially uniform due to the automatic braking action responsive to the increasing vehicle velocity.

FIG. 11 apparently shows that in the low-velocity and intermediate-velocity driving conditions, the vehicle driver is allowed to selectively set one of the assist modes in accordance with his or her inclination or preference and thereby achieve an optimum steering characteristic, because the necessary steering force or steering effort is differentiated by selecting one of the assist modes X, Y and Z. In the low-velocity drive, a change from the mode X to the mode Y (indicated in the figure by an arrow) is effected smoothly with the control characteristic of FIG. 9, so that the vehicle driver can continue driving with a desired steering characteristic without the steering feel and vehicle behavior being adversely effected by the assist mode change during travel of the vehicle.

Figure 12:
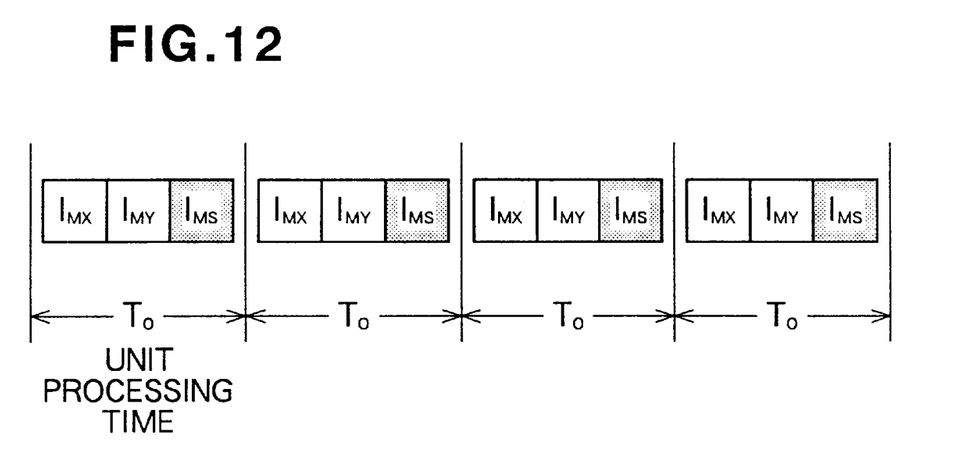
FIG. 12 is a diagram explanatory of an example of arithmetic operations executed by the mode switching unit.

FIG. 12 is a diagram explanatory of one example of the operations carried out by the mode switching unit 25 in the present embodiment. For calculation of a target motor current $I_{MS}$ at each of the unit processing times $T_O$, the mode switching unit 25 receives a pre-mode-change target motor current signal $I_{MX}$ to temporarily stores the signal $I_{MX}$ into one of the registers and then receives a post-mode-change target motor current signal $I_{MY}$ to temporarily stores the signal $I_{MY}$ into the other register. Subsequently, in the mode switching unit 25, the pre-mode-change and post-mode-change target motor current signals $I_{MX}$ and $I_{MY}$ are read out from the respective registers, so that the former signal $I_{MX}$ is multiplied by a transition coefficient $K_T$ (i.e., $K_T \cdot I_{MX}$) while the latter signal $I_{MY}$ is multiplied by a transition coefficient ($(1-K_T)$). The thus-multiplied two signals are then added together to provide a target motor current $I_{MS}$ ($I_{MS-}$) in the manner as expressed in Equation (1) above.

According to the example of FIG. 12 where two target motor current signals are stored and read out to evaluate a target motor current $I_{MS}$ ($I_{MS-}$) at the processing time $T_O$, it is possible to calculate an accurate target motor current $I_{MS}$ ($I_{MS-}$). The mode switching unit 25 executes similar operations with respect to Equation (2) above.

By thus calculating a target motor current $I_{MS}$ ($I_{MS-}$), to be used at the time of an assist mode change, on the basis of the pre-mode-change and post-mode-change target motor current signals $I_{MX}$ and $I_{MY}$ at each of the predetermined processing times $T_O$, the mode switching unit 25 can accurately determine a steering characteristic to be applied during the course of a shift to a newly selected steering assist mode.

Figure 13:
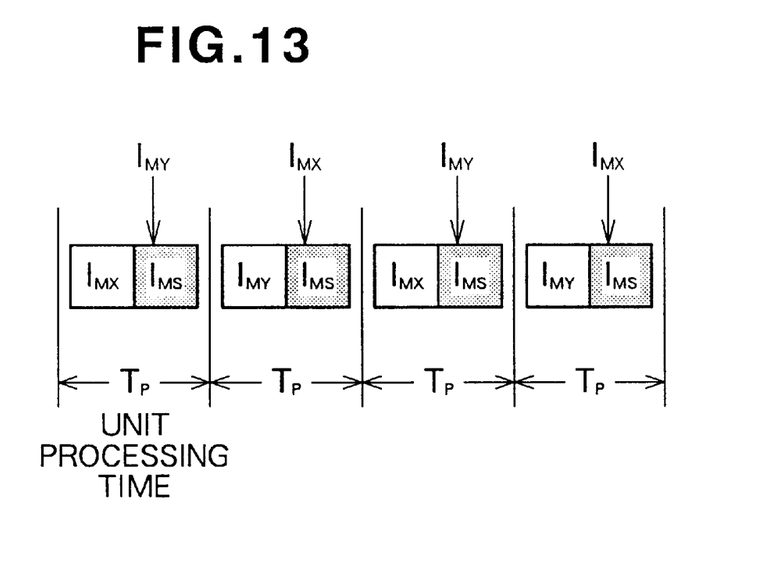
FIG. 13 is a diagram explanatory of another example of the arithmetic operations carried out by the mode switching unit.

FIG. 13 is a diagram explanatory of another example of the operations carried out by the mode switching unit 25 in the present embodiment, which is generally similar to the example of FIG. 12 in that a pre-mode-change target motor current signal and a post-mode-change target motor current signal are stored and read out at the initial processing time but is different therefrom for operations at and after the second processing times. Namely, in FIG. 13, for calculation of a target motor current $I_{MS}$ at the initial processing time $T_p$, the mode switching unit 25 receives a pre-mode-change target motor current signal $I_{MX}$ to temporarily stores the signal $I_{MX}$ into the register and then reads out the pre-mode-change target motor current signal $I_{MX}$ from the register while reading out, from the RAM, a post-mode-change target motor current signal $I_{MY}$ already stored in the RAM at the preceding processing time. The thus read-out signals $I_{MX}$ and $I_{MY}$ are then subjected to multiplications by the transition coefficient $K_T$ to provide a target motor current $I_{MS}$ ($I_{MS-}$) in the manner as expressed in Equation (1) above.

At the next processing time $T_p$, the pre-mode-change target motor current signal $I_{MX}$ temporarily stored in the register at the preceding processing time is stored into the RAM, and a new post-mode-change target motor current signal $I_{MY}$ is received and temporarily stored into the register. Then, the post-mode-change target motor current signal $I_{MY}$ and pre-mode-change target motor current signal $I_{MX}$ from the register are read out from the register and the RAM, respectively, so that the thus read-out signals $I_{MY}$ and $I_{MX}$ are then subjected to multiplications by the transition coefficient $K_T$ to provide a target motor current $I_{MS}$ ($I_{MS-}$) in the manner as expressed in Equation (1) above. Such operations are repeated at the succeeding processing times.

According to the example of FIG. 13 where one target motor current signal is stored and read out and another target motor current signal previously stored is read out so as to evaluate a target motor current $I_{MS}$ ($I_{MS-}$) through multiplications by the transition coefficient $K_T$ at each of the predetermined unit processing times $T_p$, it is possible to rapidly calculate a target motor current $I_{MS}$ ($I_{MS-}$) to be used during the course of a shift between the assist modes.

Specifically, the mode switching unit 25 can effectively lessen the arithmetic operations for determining a steering characteristic to be applied during the course of a shift to a newly selected steering assist mode, with the arrangement that at each of the predetermined unit processing times within the transition period, a target motor current $I_{MS}$ ($I_{MS-}$) to be used in the transition period is calculated by arithmetic operations using a current value of one of the target motor current signals of the two assist modes before and after the assist-mode-change instruction and a last or most-recent value of another of the target motor current signals and that the use of the current and last values of the target motor current signals alternates every unit processing time in such a manner that the current value of the target motor current signal used at a particular unit processing time is used as the last value of the target motor current signal at the next unit processing time.

Note that at the start of movement of the vehicle, the steering characteristic is compulsorily set to that of the assist mode Y.

What is claimed is:

1. An electric power steering apparatus for an automotive vehicle comprising:

an electric motor for applying an electric steering assist to a steering system of the automotive vehicle;

a steering torque sensor for detecting steering torque manually applied to the steering system;

a control unit for setting a target motor current corresponding at least to the steering torque detected by said steering torque sensor, said control unit having a plurality of assist modes to which are allocated respective target motor current signals different in characteristic;

a drive for driving said electric motor in accordance with a motor control signal generated by said control unit on the basis of the target motor current; and a mode switching unit, provided in said control unit, for, in response to an assist-mode-change instruction, effecting a successive, gradual shift, over time, from the target motor current signal of one of the assist modes having been used before the assist-mode-change instruction to the target motor current signal of another of the assist modes to be used after the assist-mode-change instruction.

2. An electric power steering apparatus as recited in claim 1 wherein said mode switching unit Includes:

a data receiving section for receiving the target motor current signals of both the assist modes before and after the assist-mode-change instruction;

a transition coefficient generator for generating a transition coefficient time-varying in value within a predetermined transition period; and an arithmetic operator for calculating the target motor current to be used during the course of a shift between the assist modes, on the basis of the target motor current signals of said assist modes before and after the assist-mode-change instruction and the transition coefficient generated by said transition coefficient generator.

3. An electric power steering apparatus as recited in claim 1 wherein said mode switching unit, at each of a plurality of predetermined unit processing times within the transition period, calculates the target motor current to be used during the course of the shift, through arithmetic operations using a current value of one of said target motor current signals of the two assist modes before and after the assist-mode-change instruction and a last value of another of said target motor current signals, and wherein use of the current and last values alternates between said target motor current signals every said unit processing time in such a manner that the current value of the target motor current signal used at a particular one of the unit processing times is used as the last value of said target motor current signal at the next unit processing time.

* * * * *